United States Patent [19]
Shindo et al.

[11] 4,088,214
[45] May 9, 1978

[54] THERMALLY SENSITIVE PRINTER

[75] Inventors: Takemasa Shindo; Yoshikazu Ito; Kenichiro Arai, all of Shiojiri, Japan

[73] Assignees: Shinshu Seiki Kabushiki Kaisha; Kabushiki Kaisha Suwa Seikosha, both of Tokyo, Japan

[21] Appl. No.: 708,953

[22] Filed: Jul. 26, 1976

[30] Foreign Application Priority Data

Jul. 25, 1975 Japan ............................... 50-91289

[51] Int. Cl.² .............................................. B41J 3/20
[52] U.S. Cl. ................................... 400/120; 400/124; 400/568
[58] Field of Search ................... 197/1 R, 82, 84, 127, 197/133, 114, 120; 101/93.04, 93.05; 346/76 R; 219/216; 318/696; 226/37

[56] References Cited

U.S. PATENT DOCUMENTS

| | | | |
|---|---|---|---|
| 3,787,886 | 1/1974 | McCrady | 197/133 R X |
| 3,810,192 | 5/1974 | Okabe | 197/133 R X |
| 3,845,850 | 11/1974 | Herr et al. | 197/133 R X |
| 3,935,938 | 2/1976 | Hodne | 197/133 R X |
| 4,004,672 | 1/1977 | Hirano et al. | 197/1 R |

*Primary Examiner*—William Pieprz
*Attorney, Agent, or Firm*—Blum, Moscovitz, Friedman & Kaplan

[57] ABSTRACT

An improved thermally sensitive printer for recording characters on a thermally sensitive medium is provided. An exothermic printing head includes a substrate and a plurality of selectively energized resistance elements supported on the substrate, the resistance elements being energized during a printing operation to print characters on a thermally sensitive medium in contact therewith. A rotary platen is provided for bringing the thermally sensitive medium into printing contact with the resistance printing elements to thereby effect printing on the thermally sensitive medium during a printing operation. The rotary platen is also adapted to incrementally advance the thermally sensitive printing medium after each printing operation. An oscillatory drive motor is provided for producing a reciprocating rotary driving force and a rotary motion transformer is coupled intermediate the oscillatory driving motor and the rotary platen for rotating the rotary platen through a predetermined pitch in response to said reciprocating rotary drive of said oscillatory driving motor to thereby intermittently advance by a predetermined distance the thermally sensitive medium after each printing operation.

20 Claims, 18 Drawing Figures

THERMALLY SENSITIVE PRINTER

BACKGROUND OF THE INVENTION

This invention is directed to a thermally sensitive printer and in particular to an improved thermally sensitive printer having an exothermic printing head for forming print characters on a thermally sensitive recording medium.

While thermally sensitive printers having exothermic printing heads have taken on various forms, such printers are usually extremely large sized and expensive to manufacture. Also, such thermally sensitive printers often have less than completely satisfactory feeding mechanisms for advancing the thermally sensitive medium after each printing operation. Such difficulties in advancing the thermally sensitive recording medium result from the recording medium sticking to the exothermic elements forming the printing head after each printing operation. Thus, a small-sized, simple and inexpensive thermally sensitive printer capable of avoiding the sticking problems encountered in the prior art is desired.

SUMMARY OF THE INVENTION

Generally speaking, in accordance with the instant invention, a thermally sensitive printer for recording a character on a thermally sensitive medium is provided. The printer includes an exothermic printing head comprised of a substrate and a plurality of selectively energized resistance elements supported by the substrate. The resistance elements are adapted to be energized during a printing operation and thereby print characters on a thermally sensitive recording medium. A rotary platen is provided for bringing the thermally sensitive recording medium into printing contact with the resistance printing elements to effect printing on the recording medium and is further adapted to incrementally advance the printing medium after each printing operation. An oscillatory driving motor is adapted to produce a reciprocating rotary driving force and a rotary motion transformer is coupled intermediate the oscillatory driving motor and the rotary platen to incrementally rotate the rotary platen through a predetermined pitch in response to the reciprocating drive of the oscillator and thereby incrementally advance the thermally sensitive recording medium by a predetermined distance after each printing operation.

Accordingly, it is an object of the instant invention to provide an inexpensive, compact and light thermally sensitive printer.

A further object of the instant invention is to provide an improved thermally sensitive printing assembly wherein the number of subassemblies forming same is reduced and wherein the subassemblies are themselves improved.

Still another object of the instant invention is to utilize a single one-piece frame for supporting an entire thermally sensitive printer assembly.

Still another object of the instant invention is to provide an improved thermally sensitive printer assembly wherein stick between the exothermic printing head and the thermally sensitive recording medium is reduced.

Still another object of the instant invention is to provide an improved exothermic printing head in a thermally sensitive printer assembly.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1A:
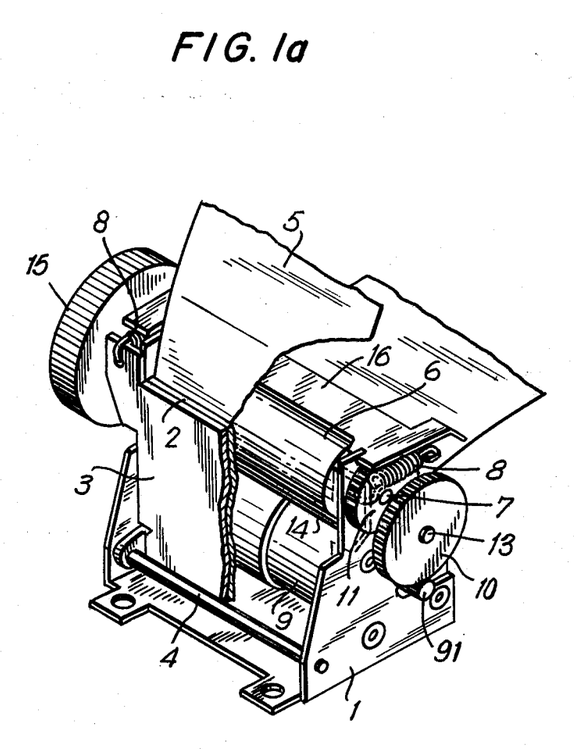
FIG. 1a is a partially sectioned perspective view of a thermally sensitive printer assembly constructed in accordance with a preferred embodiment of the instant invention.
Figure 1B:
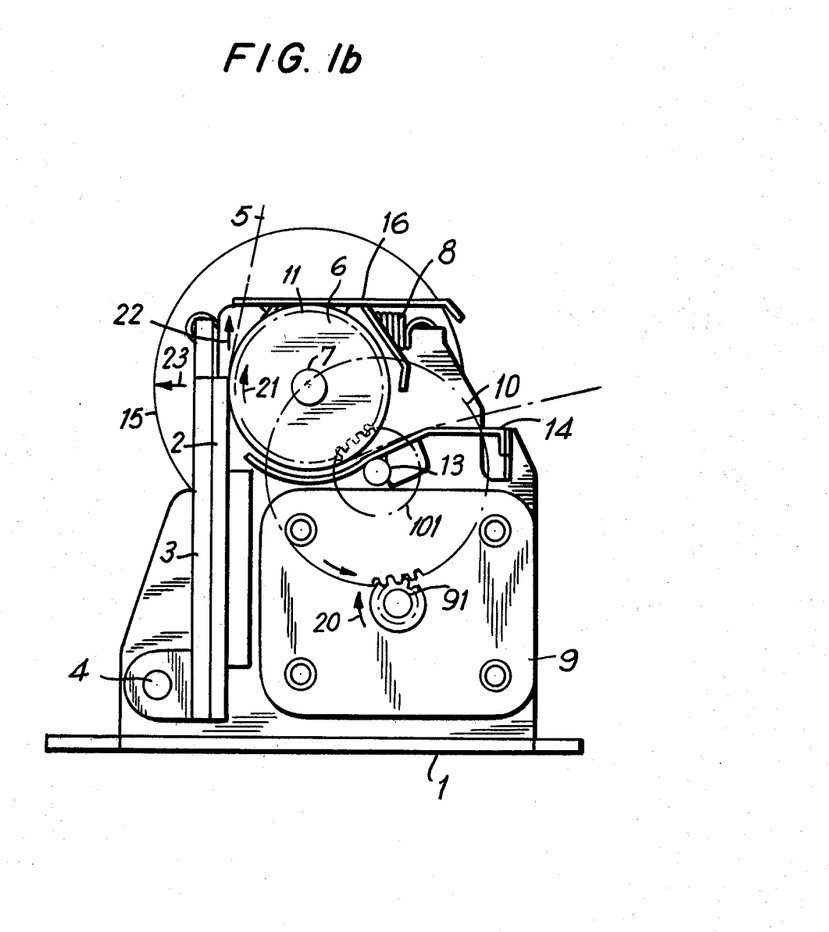
FIG. 1b is an elevational view of the thermally sensitive printer assembly depicted in FIG. 1.

Reference is now made to FIGS. 1a and 1b wherein a thermally sensitive printer assembly constructed in accordance with a preferred embodiment of the instant invention is depicted. A U-shaped one-piece sheet metal frame supports a rotary spindle 4, which spindle rotatably supports a supporting plate 3 having an exothermic type thermally sensitive printing head 2 thereon for forming characters on thermally sensitive paper 5 that is brought in contact therewith. In addition to supporting the exothermic type thermally sensitive printing head 2, supporting plate 3 operates as a heat sink for reducing the heat radiated by the printing head. A rotary platen 6 is rotatably supported on a spindle 7, which spindle is supported by the U-shaped frame 1 to thereby position the rotary platen in abutting contact (see FIG. 1b) with the thermally sensitive printing head 2 to thereby force the thermally sensitive paper disposed therebetween into contact with the printing head 2. The U-shaped frame 1 further supports a paper guide 14, which paper guide is adapted to guide the thermally sensitive paper around the rotary platen 6 and hence to the abutting position between the rotary platen 6 and thermally sensitive printing head 2. The exothermic type thermally sensitive printing head 2 is spring biased against the rotary platen 6 by pressure spring 8. Spring 8 is secured at a first end to the U-shaped frame 1 and at the other end is coupled to the supporting plate 3 to thereby pivot same in a clockwise direction about rotary spindle 4 and thereby place the exothermic type thermally sensitive printing head 2 in abutting contact with a thermally sensitive printing medium disposed between the printing head and rotary platen.

U-shaped frame 1 further supports an oscillatory drive motor and rotary motion transformer subassembly 9, which subassembly includes intermittent driving gear 91, which gear transmits an intermittent rotary motion in the clockwise direction, illustrated as 20 in FIG. 1b, to a transmitting gear 10 in a manner to be discussed more fully below. Transmitting gear 10 is meshingly engaged with rotary platen driven gear 11, to thereby intermittently drive driven gear 11 and hence effect intermittent rotation of rotary platen 6. It is noted that transmittal gear 10 is mounted on a rotary spindle 13 which spindle is supported by frame 1 and supports paper guide 14. Also, a manual roller 15 is provided to permit manual feeding of the thermally sensitive medium through the printer at the beginning and completion of a series of printing operations and thereby facilitate loading and unloading of the printer. Finally, a cover 16 is secured to the U-shaped frame 1 to protect the rotary platen 6. Thus, as illustrated in FIG. 1a, a compact, inexpensive and simplified thermally sensitive printer assembly wherein a single one-piece frame 1 formed from a single metal casting or stamped sheet metal structurally supports each of the structural and functional elements of the printer with a minimum number of screws and connections required.

In operation, a complete printing cycle of the printer assembly depicted in FIGS. 1a and 1b is as follows. With the thermally sensitive recording paper 5 disposed between the rotary platen 6 and thermally sensitive printing head 2, certain of the exothermic resistance elements forming the printing head are energized by the application of a pulse signal thereto, causing the resistance elements to heat up and thereby effect a printing operation by coloring the thermally sensitive recording medium 5. Upon completion of the printing operation, driving gear 91 is incrementally rotated in a clockwise direction indicated by arrow 20 to thereby effect a similar counterclockwise incrementing of transmittal gear 10, and in turn an intermittent rotation of rotaty platen 6 through a predetermined pitch in the clockwise direction illustrated by arrow 21. Accordingly, after each printing operation, the rotary platen is incrementally advanced through a predetermined pitch 6 to thereby advance the thermally sensitive recording medium 5 by a predetermined amount and thus prepare same for the next printing operation. Thus, in each printing operation, a row of dots is printed on a line, and upon successive printing operations, a matrix of dots is formed on the thermally sensitive medium by the exothermic type thermally sensitive printing head to define the print characters, best illustrated in FIG. 16.

The printing head assembly depicted in FIGS. 1a and 1b is particularly directed to reducing the stick which occurs between the exothermic head and the thermally sensitive recording medium after each printing operation. Specifically, stick represents the resistance to the advancement of the thermally sensitive recording medium when such medium is advanced to permit the next printing operation to be effected, and often occurs when the pressure applied by the platen against the exothermic type printing head is excessive. Nevertheless, since the greater the pressure at which the thermally sensitive recording medium is forced into contact with the printing head, the better the printing quality, it is imperative that sufficient pressure by the platen be applied to the recording medium to effect high print quality. Accordingly, the instant invention is particularly characterized by providing the point of contact of the exothermic printing head at a tangent point with respect to the radial dimension of the rotary platen 6. Accordingly, when the rotary platen 6 is rotated in the clockwise direction, as illustrated by arrow 21, the thermally sensitive recording medium 5 is advanced in the direction 22, which advancement is in some regards inhibited by the stick between the recording medium 5 and the printing head. Nevertheless, since the exothermic head 2 is supported on the supporting plate 3, which plate is rotationally supported about spindle 4, the force of the paper in the direction 22 causes the supporting plate 3 to pivot about spindle 4 in the direction indicated by arrow 23. Thus, the stick between the exothermic printing head 2 and recording medium 5 is utilized to effect a moment perpendicular to the recording medium 5 and thereby substantially reduce the effect of the stick on the advancement of the recording medium without in any way debasing the printing quality by having to reduce the contact pressure between the exothermic printing head and recording medium during printing.

Figure 2A:
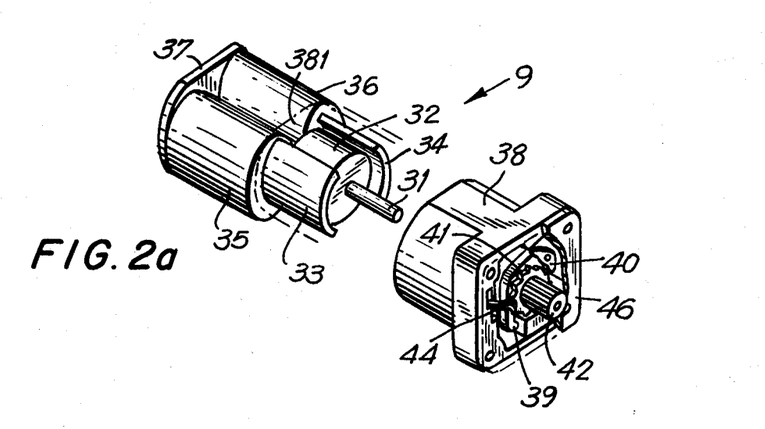
FIG. 2a is a partially sectioned perspective view of an oscillatory drive motor and transformer subassembly for use in a thermally sensitive printer constructed in accordance with a preferred embodiment of the instant invention.
Figure 2B:
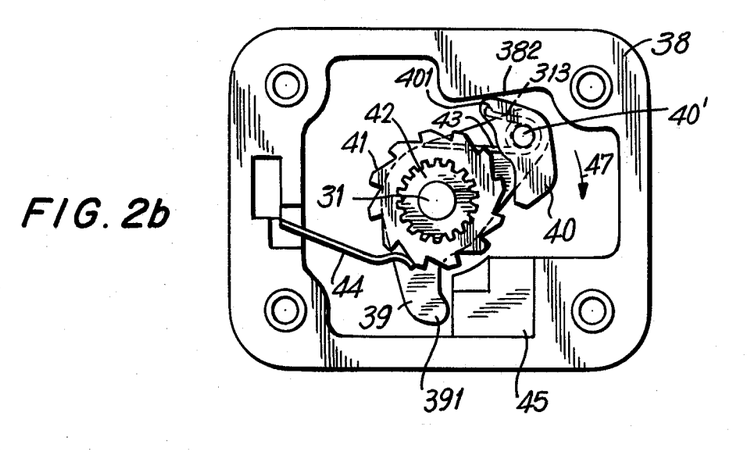
FIG. 2b is an elevational view of the oscillatory drive motor and transformer subassembly depicted in FIG. 2a with the cover plate 46 removed.

Reference is now made to FIGS. 2a and 2b, wherein the oscillatory drive motor and rotary motion transformer subassembly 9 is depicted. The respective components of the oscillator drive motor and rotary motion transformer subassembly are the oscillatory drive motor, rotary motion transformer and a sound insulator for reducing the noise inherent in the operation of the subassembly.

Figure 3:
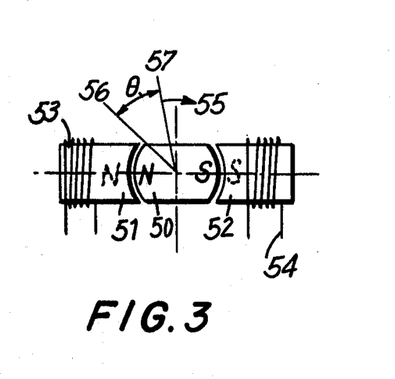
FIG. 3 is a schematic representation of the manner in which the oscillatory drive motor, depicted in FIG. 2a, operates.
Figure 4:
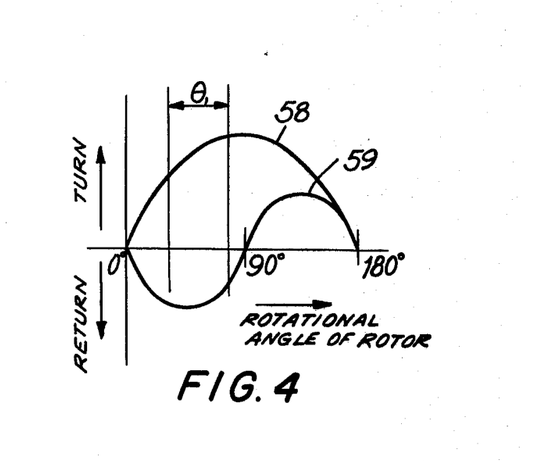
FIG. 4 is a graphical illustration of the schematic representation of the oscillatory driving motor depicted in FIG. 3.

The oscillatory drive motor is formed on a yoke 37, which yoke supports magnetic permeable stator poles 33 and 34 having stator coils 35 and 36 respectively wound therearound. The stator poles 33 and 34 surround a rotor supported on a rotor shaft 31, which shaft is rotatably mounted in bearings (not shown) in yoke 37. The rotor is formed of a diametrically oppositely poled permanent magnet to permit the rotary positioning of the rotor to be controlled by the magnetic fields of the stator poles. A diagrammatic representation of the oscillator drive motor of the instant invention depicted in FIG. 2a is illustrated in FIG. 3. In FIG. 3, diametrically oppositely poled magnetic rotor 50 is disposed between stator poles 51 and 52 having coils 53 and 54 wound therearound. The step motor is described with respect to three distinct modes of operation which modes depend on the angle through which the rotor is to be rotated. In a first mode of operation if the magnetic poles 51 and 52 are placed in NORTH (N) and SOUTH (S) polarities by energizing the poles 53 and 54 and no limitation is placed on the duration that poles 51 and 52 remain so polarized, the rotor 50 is rotated in either a clockwise or counterclockwise direction through 180°. For purposes of explanation, the clockwise direction illustrated by arrow 55 is selected. Thus, as is graphically illustrated by curve 58 in FIG. 4, a turning of the rotor 50 in the direction illustrated by the arrow 55 through 180° is effected each time the respective coils 53 and 54 are energized. In such a mode, once the coils 53 and 54 cease to be energized, the stator poles 51 and 52 are no longer magnetized and the rotor thereafter returns through the same angle 180° in the same direction as the initial rotation of the arrow. In a second mode of operation the rotor 50 is rotated through an angle of 0° to 90° by intermittently energizing coils 53 and 54 and immediately thereafter returning the coils 53 and 54 to rest position. The reciprocal rotation of the rotor 50 in the second mode through a 90° rotation is illustrated as curve 59 in FIG. 4. The third mode of operation, which mode is adopted by the instant invention adopts the reciprocal rotor drive of the second mode but limits the rotation of the rotor 50 through an angle $\theta$ for each energizing of the coils 53 and 54. Accordingly, once the current to coils 53 and 54 ceases to be applied, the rotor 50 will return through the angle $\theta$ to position 56 and once again come to a rest position. Thus, in the third mode of operation, which mode has been adopted by the instant invention, the reciprocating motion of the rotor through an angle $\theta$ is effected by alternately effecting an ON and OFF energization of the coils 53 and 54. Thus, relating this to the drive motor depicted in FIG. 2a, it is seen that the stator poles can be alternately energized and de-energized to thereby transmit through the rotor supporting shaft 31 an oscillatory drive motion, which oscillatory motion is transformed into a one-way incrementally advancing rotary motion by the transformer portion of subassembly 9. As is discussed hereinafter, the angle $\theta$ is selected by the physical constraints of the transformer.

The rotary motion transformer includes a case 38, which case is disposed at the position indicated at 381 in FIG. 2a to thereby enclose the stator and rotor construction. The rotary motion transformer is particularly comprised of a lever 39, which lever is fixably secured to the rotor shaft 31 to be rotated thereby. A pawl 40 is rotatably secured to lever 39 at pivot 40' and is biased about pivot 40' in a clockwise direction indicated by arrow 47 by a pawl spring 43. A ratchet wheel 41 is rotatably mounted to the rotor shaft 31, and gear 42 is mounted to the ratchet wheel 41, to thereby represent the intermittent driving gear of the subassembly corresponding to driving gear 91 depicted in FIG. 1b. As is detailed below, a stopper 45 for determining the rotational angle through which the rotor is to rotate is disposed on the frame of the subassembly.

Operation of the rotary motion transformer is explained in accordance with the oscillatory drive motion imparted to the shaft by the drive motor described above. The rotational angle $\theta$ through which the rotary shaft 31 is rotated is determined by the manner in which the lever 39 and pawl 40 engage the stopper 45. For purposes of explanation, the position of the lever 39 in FIG. 2b, with the portion of the lever 391 in abutting contact with stopper 45 represents the rest position of the rotor when the energizing coils are not being energized. At this time, the pawl 40 is out of engagement with the ratchet wheel 41 so that the ratchet wheel can be freely rotated in either a clockwise or counterclockwise direction. Once the coils 35 and 36 are energized, the rotor shaft 31 is rotated in a clockwise direction and thereby effects a rotation of lever 39 in the clockwise direction indicated by the arrow 47. As the pawl 40 is rotated out of engagement with biasing wall 382, pawl spring 43 effects a clockwise rotation of the pawl 40 and thereby effects engagement of the pawl 40 with the ratchet wheel 41. The combination of the rotation of the lever 39 and pivoting of pawl 40 by pawl spring 43 causes the ratchet wheel to be rotatably advanced until pawl 40 strikes the stopper 45 and comes to rest, thereby advancing the ratchet wheel by one tooth pitch.

Once the pawl 40 strikes the stopper 45, the lever 39 stops rotating and thereby prevents the rotor shaft 31 from further rotating. Thereafter, when the rotor shaft 31 is returned to a rest position by the deenergization of the stator coils 35 and 36, the ratchet wheel spring 44 prevents the ratchet wheel from rotating in the opposite rotational direction. Moreover, the shaft is rotated to a rest position determined by the position at which the portion 391 of lever 39 strikes stopper 45, and accordingly, the angle $\theta$ through which the rotor shaft 31 is rotated is determined by the engagement of the stopper 45 by the pawl 40 when the rotor shaft 31 is rotated through a first rotational angle and by engagement of stopper 45 by lever 39 when the rotor shaft is returned through the same rotational angle. Thus, the above-described ON-OFF energization of the stator coils 35 and 36 imparts an oscillatory rotary motion to the rotor shaft 31, which motion is converted into a one-way intermittent rotational motion imparted to driving gear 42 to effect one-way incremental driving of the rotary platen 6 in the manner discussed above with respect to FIGS. 1a and 1b.

Finally, the sound insulator portion of the subassembly 9 is particularly comprised of the case 38 for the rotary motion transformer and the cover plate 46 adapted to be secured to the case 38 for enclosing the transformer mechanism. Specifically, with the exception of the driving wheel 42, the entire rotary motion transformer mechanism is hermetically enclosed in the case 38 by utilizing a cover plate 46. Accordingly, the sound caused by the striking of the stopper 45 by the portion 391 of the lever 39 and of the stopper 45 by the pawl 40 is considerably reduced by forming a stopper 45 of a resilient absorption material such as rubber and the like. Accordingly, when the rotary motion transformer mechanism is hermetically sealed and sound insulators are utilized to effect such sealing between the case 38 and the cover plate 46, the sounds generated by the striking of the stopper 45 are sufficiently weakened as to bearly be audible. One further feature noted in the embodiment depicted in FIG. 2b is that the ratchet wheel spring 44 and stopper 45 can be integrally formed on the transformer case 38 thereby further avoiding the necessity of utilizing screws to secure the component elements of the subassembly together, and thereby further facilitate assembly thereof.

Figure 5:
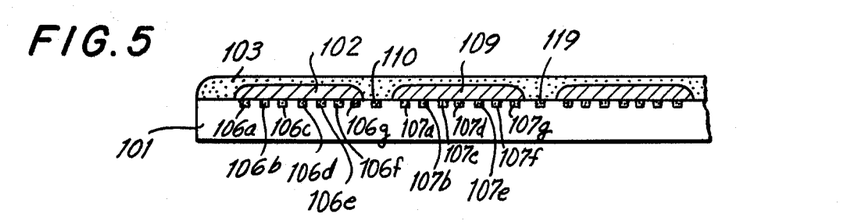
FIG. 5 is a sectional view of an exothermic type thermally sensitive printing head constructed in accordance with a preferred embodiment of the instant invention.
Figure 6:
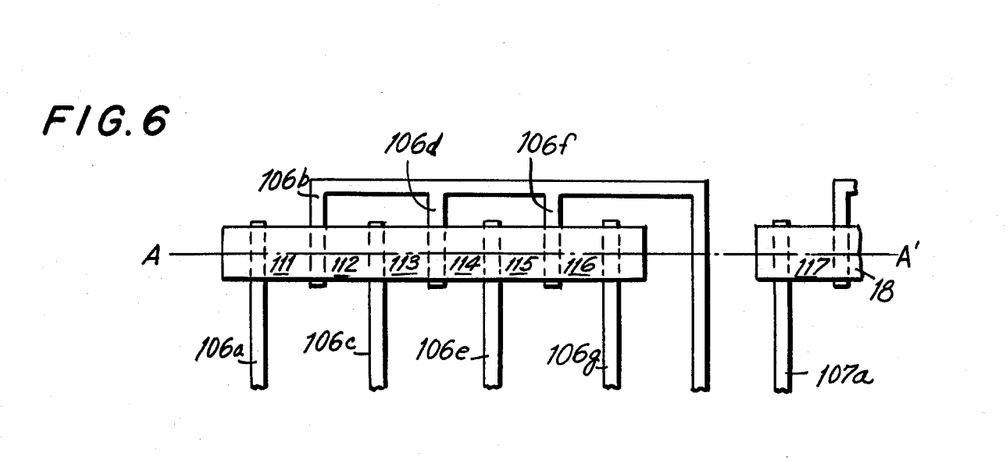
FIG. 6 is an enlarged plan view of the conductor arrangement for one column of the exothermic type thermally sensitive printing head depicted in FIG. 5.
Figure 7:
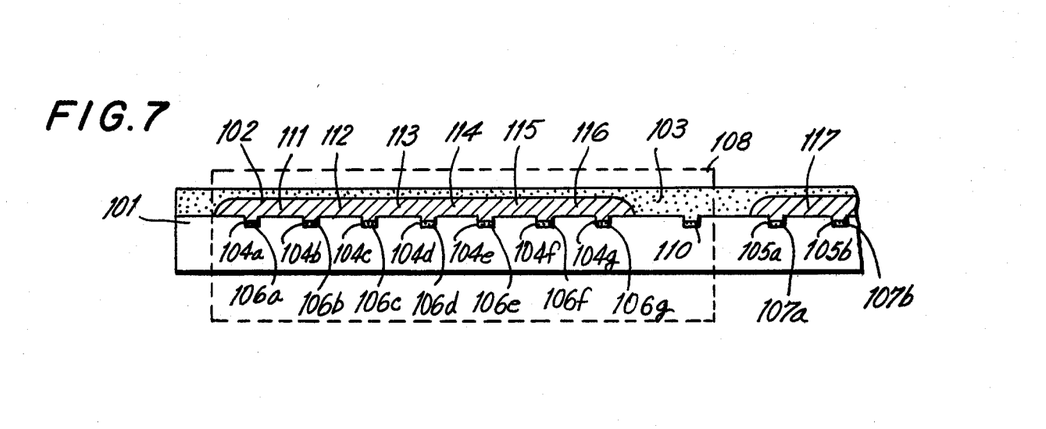
FIG. 7 is a sectional view taken along line A-A' in FIG. 6.

Reference is now made to FIGS. 5 through 7 wherein a exothermic type thermally sensitive printing head for use in a thermally sensitive column printer of the type to which the instant invention is directed is depicted. A support substrate 101 is formed with a plurality of grooves 104a, 104b, 104c, 111, 104g, 105a, 105b, . . . , which grooves are formed in parallel on a substrate 101 by conventional photoetching techniques. Electrodes 106a, 106b, 106c . . . 106g, 107a, 107b . . . are disposed in the grooves 104a, 104b, 104c . . . 104g, 105a, 105b . . . by utilizing gold, copper and/or silver conductors that are secured in the grooves of the substrate by conventional vacuum evaporation or other suitable conductor forming techniques.

A conventional exothermic resistance material is disposed over the conductors and is coated with a glass resin 103 to protect same against damage or excessive friction wearing during operation. Accordingly, a first column printing head 102 is defined by a portion 111 of the exothermic resistance material 102 overlying electrodes 106a and 106b. Similarly, exothermic portion 112 is formed between electrodes 104b and 104c, and accordingly the overlying exothermic material 102 defines the dot-shaped exothermic portions 111 through 116 depicted in FIG. 6. Thus, the resistors 106a through 106g and common return electrode 110, which electrode is adapted to commonly reference electrodes 106b, 106d and 106f comprise the characters of a first column to be printed on a thermally sensitive recording medium. Similarly, a second column printing head is defined by conductors 107a through 111g exothermic resistance material 109. As illustrated in FIG. 6, the character to be produced by the exothermic elements is obtained by selectively energizing conductors 106a, 106c, 106e and 106g by selectively applying pulses thereto. For example, if electrode 106c is energized, the potential difference between the electrode 106c and the commonly referenced electrodes 106b and 106d effects a current flow between electrodes 106c and commonly referenced electrodes 106b and 106d, which current flow effects a heating of the exothermic resistance portions 112 and 113 to thereby effect a printing of a pair of dots on a thermally sensitive recording medium in contact therewith. Reference is specifically made to U.S. patent application Ser. No. 615,864, filed Sept. 23, 1975, and now U.S. Pat. No. 4,048,470, which application is a co-pending application with respect to this application, is owned by the same assignee as this application, and is incorporated by reference herein to further explain the operation of exothermic printing heads of the type disclosed herein.

Figure 8:
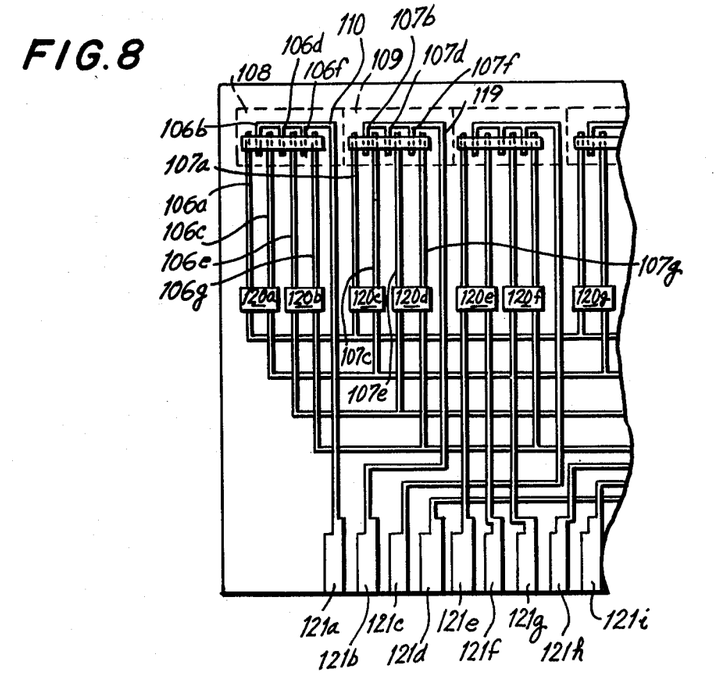
FIG. 8 is a plan view of an exothermic type thermally sensitive printing head constructed in accordance with the instant invention.

The manner in which the specific exothermic portions are selected for printing is more particularly illustrated in FIG. 8, wherein the manner in which the respective characters are disposed in parallel to each other is illustrated, like reference numerals being utilized to denote like elements depicted in FIGS. 5 through 7. Diode packages 120a, 120b, 120c, etc., are utilized to prevent interference between the respective digits and accordingly, the diodes are also mounted to the substrate. Thus, in order to insure that the column selecting electrodes 121a, 121b . . . 121i function to effect unidirectional current flow through the resistance elements, the diode packages are necesary to assure proper parallel driving operation.

Figure 9:
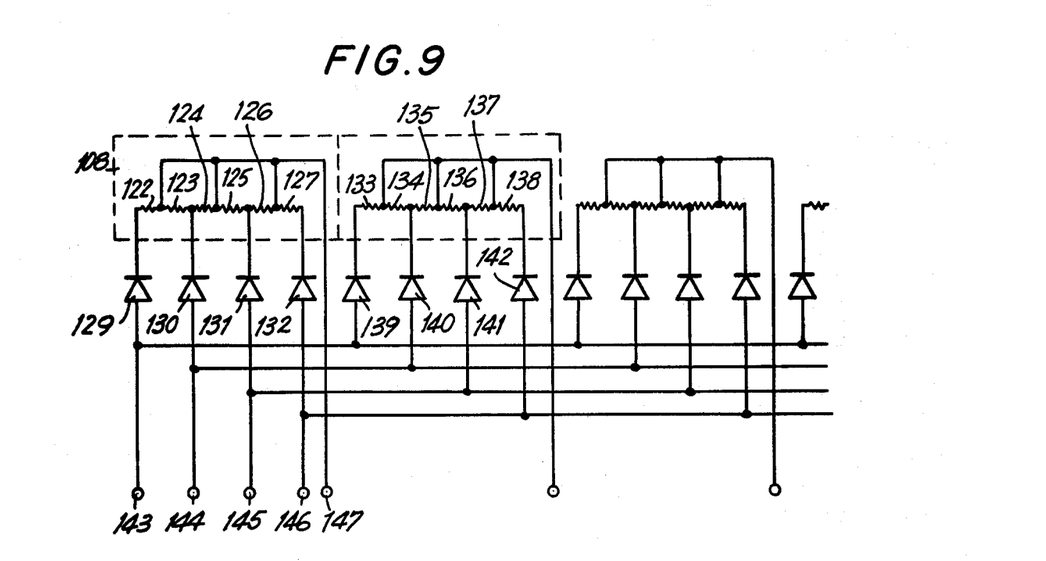
FIG. 9 is an equivalent circuit diagram of the exothermic type thermally sensitive printing head depicted in FIG. 8.

In FIG. 9, a schematic representation of the circuitry formed by the exothermic printing head depicted in FIG. 8 demonstrates the reasons for providing the respective diode packages illustrated therein. Specifically, if diodes 129 through 132 are not provided for column 108, no assurance can be made that the current flow through the resistance elements will be unidirectional and eventuate in a current return through common electrode 128 through terminal 147. Thus, the exothermic resistance portions for the column 108 includes equivalent resistances 122, 123, 124, 125, 126 and 127, whereas the exothermic resistance portion for a second column are represented by resistors 133 through 138. Moreover, terminals 143, 144, 145 and 146 are utilized to select the respective exothermic resistance portions to be energized in each column, with the respective columns being selected by the common return conductors.

Figure 10:
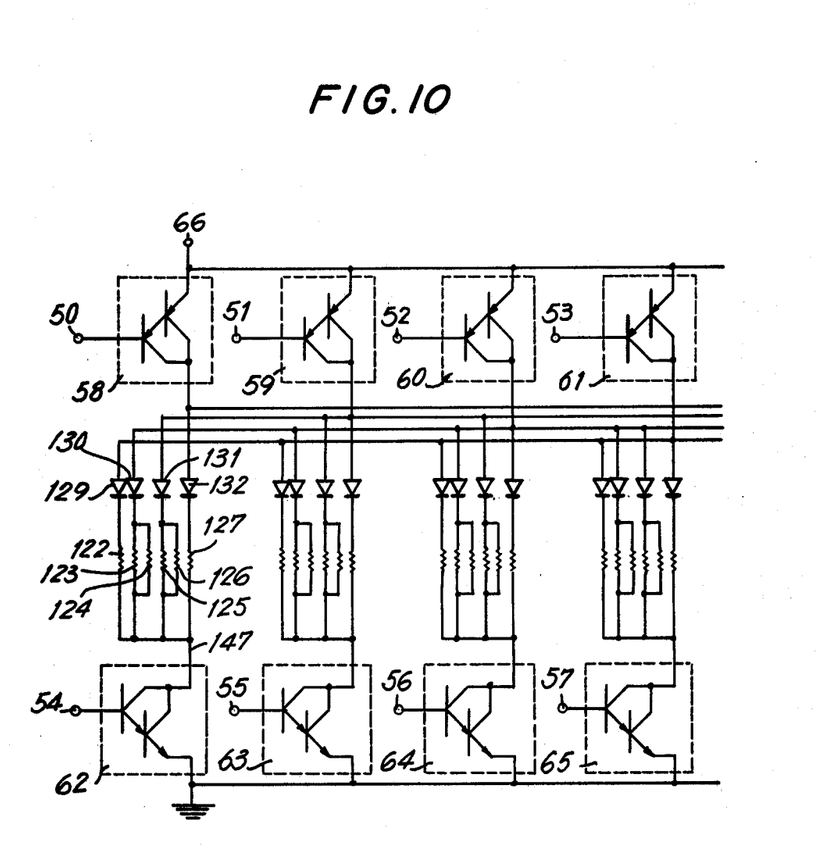
FIG. 10 is a circuit diagram of a parallel column driving circuit for energizing the exothermic type thermally sensitive printing head illustrated in FIG. 8.

A specific driving circuit for driving the exothermic printing head illustrated in FIG. 8 is depicted in FIG. 10, the exothermic printing head being illustrated as an equivalent circuit diagram in the same manner depicted in FIG. 9. Terminal 66 is referenced to a DC voltage supply on the order of 24V. Accordingly, the collector-emitter paths of transistor pairs 58, 59, 60 and 61 are respectively coupled through diodes groups to either a single like positioned exothermic element in each column or a pair of like positioned exothermic elements in each column, and hence, define a parallel connection with like positioned exothermic elements disposed in each column. Additionally, the common return electrode of each column is respectively coupled to the collector-emitter paths defined by transistor pairs 62, 63, 64, 65, which transistor pairs are utilized to select the respective columns to be energized. Accordingly, by applying a pulse to the respective base electrodes 54, 55, 56, 57 of transistor pairs 62, 63, 64, 65, respectively, a suitable combination of the columns to be printed, and the specific exothermic resistance within each column can be effected, to thereby print desired characters on the thermally sensitive recording medium. Although the drawings illustrate a four column printer, the instant invention is clearly not limited thereto.

Figure 11:
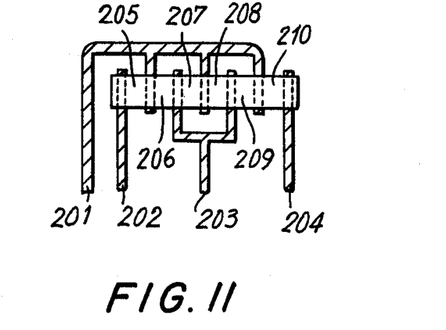
FIGS. 11 through 15 are plan views of conductor arrangements for forming exothermic type thermally sensitive printing heads in accordance with the preferred embodiment of the instant invention.
Figure 12:
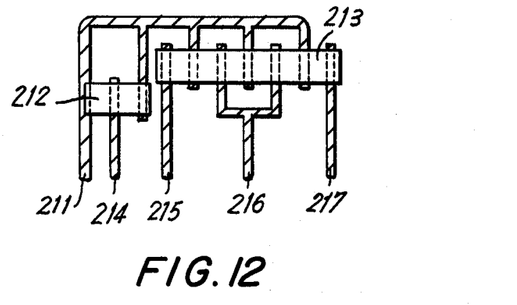
Figure 13:
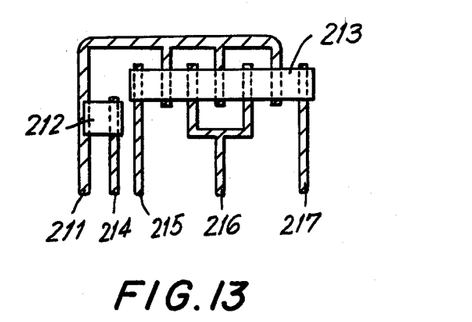
Figure 14:
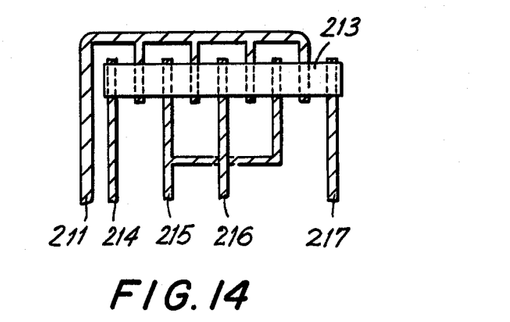
Figures 15, 16:
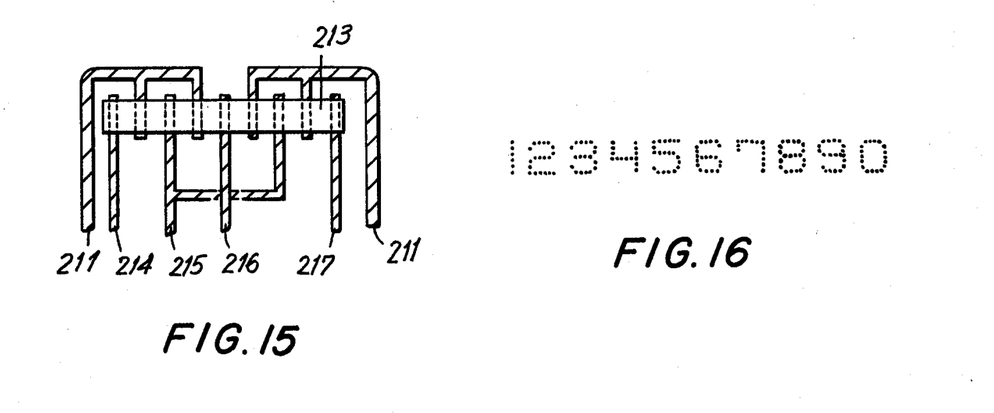
FIG. 16 is an illustration of print characters formed on a thermally sensitive medium by the exothermic printing head depicted in FIG. 11.

Reference is now made to FIG. 11, wherein an example of an exothermic printing head constructed in accordance with the instant invention, for producing the print characters illustrated in FIG. 16, is depicted. The exothermic portions 305, 206, 207, 208, 209 and 210 define printing dots, and the pairs of dots represented by exothermic portions 206, 207, 208, and 209 are connected to a single selecting electrode 203. Accordingly, in response to the referencing of the potential of electrode 203 to a potential distinct from the potential of the commonly referenced electrode 201, a current flow through the exothermic portion is effected and thereby causes a simultaneous printing of four dots by the exothermic portions 206, 207, 208, 209. As is illustrated in FIG. 16, when arabic numerals are to be displayed, a 6 × 7 dot matrix representation can be effected by printing the four dots across to reflect horizontal bars and by energizing electrodes 202 and/or 204 when single dots are required to define the vertical portions of the arabic numerals depicted in FIG. 16. Thus, only four control electrodes are required to effect the printing of arabic characters when the arrangement illustrated in FIG. 11 is utilized with a single common conductor to produce a 6 × 7 dot matrix printing pattern. Moreover, the circuit becomes less expensive to manufacture as the number of electrodes is reduced since the reduction in the number of electrodes causes a likewise reduction in the number of diode packages required.

Referring now to FIGS. 12, 13, 14, and 15, like reference numerals are utilized to denote like elements to depict alternate conductor configurations for exothermic printing heads manufactured in accordance with the instant invention. Thus, in FIGS. 11 through 15, electrode 211 is a common electrode that commonly references each of the exothermic resistance portions to a reference terminal of a voltage supply or ground. Additionally, in each embodiment, electrode 214 is a control terminal for printing a comma or a decimal point, and electrodes 215, 216 and 217 are further control electrodes for selecting the column information to be printed in the same manner discussed above with respect to FIG. 11. Accordingly, the instant invention is particularly characterized by the use of the exothermic printing head configurations depicted in FIGS. 11 through 15 depicted in the drawings and described above to thereby produce a highly efficient, inexpensive and high quality thermally sensitive printer.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a thermally sensitive printer for recording a character on a thermally sensitive medium, the improvement comprising in combination exothermic printing means including a substrate and a plurality of selectively energized resistance means supported by said substrate, said resistance means being adapted to be energized during a printing operation and thereby print characters on a thermally sensitive medium, first conductor means mounted on said substrate, said first conductor means including at least one pair of commonly referenced conductors, second conductor means mounted on said substrate and including at least one second conductor disposed intermediate each pair of commonly referenced first conductors, said plurality of selectively energized resistance means being defined by exothermic means overlying each said first pair of conductors and second conductor disposed intermediate said pair of first conductors, said exothermic means being adapted to be energized during a printing operation to produce at least one pair of dots on said thermal sensitive medium in response to said second conductor means being selectively energized to a potential different than the potential at which said first pair of conductors are commonly referenced; rotary platen means for bringing said thermally sensitive recording means into printing contact with said resistance printing means to effect printing thereby, said rotary platen means being further adapted to incrementally advance said printing medium after each printing operation; driving means for producing a rotary driving motion; and transformer means disposed intermediate said rotary drive means and said rotary platen means for rotating said rotary platen means through a predetermined pitch in response to said drive of said rotary drive means to thereby incrementally advance said thermally sensitive medium by a predetermined distance after each printing operation.

2. A thermally sensitive printer as claimed in claim 1, and including support means for supporting said exothermic printing means substrate, said support means being adapted to resiliently bias said resistance means on said substrate into pressure contact with said recording medium to thereby engage said recording medium between said resistance element means and said rotary platen, said support means furher including mounting means for releasing said biasing pressure against said recording medium during each advancement of said recording medium.

3. A thermally sensitive printer as claimed in claim 2, wherein said support means includes resilient biasing means for resiliently tensioning said support means against said rotary platen, said mounting means being adapted to pivotably support said supporting means to provide a turning moment in a direction perpendicular to the direction that the recording medium is incrementally advanced by the rotary platen at the position that the thermally sensitive recording medium is disposed between the rotary platen and resistance printing means.

4. A thermally sensitive printer as claimed in claim 1, and including a one-piece frame having a U-shaped cross-section defined by a support member and two upstanding leg portions, said respective leg portions rotatably supporting said rotary platen means, driving means and transformer means.

5. A thermally sensitive printer as claimed in claim 4, and including support means for supporting said exothermic printing means substrate, said support means including a spindle rotatably supported by said upstanding legs of said frame, and a support plate pivotably secured to said spindle to permit same to be positioned to dispose said recording medium in pressure contact between said resistance means and said rotary platen means, said rotary platen means including a shaft, said shaft being rotationally supported by said upstanding legs of said frame to permit said rotary platen to bring said thermally sensitive recording medium into printing contact with said resistance printing means and additionally incrementally advance same in response to each rotation thereof.

6. A thermally sensitive printer as claimed in claim 5, wherein driving means is adapted to oscillate and produce a reciprocating rotary drive motion, said transformer means including rotary conversion means coupled to said oscillatory driving means for converting the reciprocating rotary driving motion produced thereby into a one-way incrementally advancing rotary driving motion, and rotary transmitting means for mechanically coupling said rotary conversion means to said rotary platen means to effect said rotation of said rotary platen means through a predetermined pitch in response to said one-way driving motion of said rotary conversion means.

7. A thermally sensitive printer as claimed in claim 6, wherein said rotary transmitting means includes transmittal gear means mounted on a spindle mens to permit same to be rotated thereabout, said spindle means being supported by the upstanding legs of said frame, said transmittal gear means being coupled to said rotary conversion means and to said rotary platen means to transmit said one-way rotary driving motion from said conversion means to said rotary platen means.

8. A thermally sensitive printer as claimed in claim 7, wherein said shaft supporting said rotary platen means includes a gear disposed at the end thereof, said gear being in meshing engagement with said transmittal gear means, said one-way conversion means also including a gear means in meshing engagement with said transmittal gear means to effect one-way driving thereof.

9. A thermally sensitive printer as claimed in claim 1, wherein said driving means includes an oppositely magnetically poled rotor means and stator means disposed about said rotor means for reciprocally rotating said rotor means, said rotor means including a support shaft about which said rotor means is rotated for producing a reciprocating rotary driving motion in response to said reciprocal rotation of said rotor means.

10. A thermally sensitive printer as claimed in claim 9, wherein said transformer includes a lever fixedly secured to said rotor shaft, said lever being reciprocated between a first rest position and an advance position by the reciprocal rotation of said rotor shaft, ratchet means rotatably positioned on said rotor shaft for producing said transformer means rotary drive motion, and pawl means disposed on said lever, said pawl means being adapted to incrementally advance said ratchet wheel through a predeterminned rotary angle in a first rotary direction in response to each displacement of said lever from a rest position to an advance position.

11. A thermally sensitive printer as claimed in claim 10, and including bias means adapted to engage said ratchet means and prevent said ratchet means from being incrementally rotated when said lever is returned from an advance position to a rest position.

12. A thermally sensitive printer as claimed in claim 11, and including stopper means disposed in the path of said lever, said stopper means being adapted to define at least said advance position by preventing the displacement of said lever past said advance position in response to each rotation of said rotor means.

13. A thermally sensitive printer as claimed in claim 1, wherein said second conductor means includes at least one further second conductor mounted externally of said at least one pair of commonly referenced first conductor pairs for producing a single dot on said thermally sensitive medium in response to said additional second conductor being referenced to a potential different than the potential at which said first pair of conductors are commonly referenced.

14. A thermally sensitive printer as claimed in claim 1, wherein said second conductor means includes at least two further second conductors mounted externally of said pairs of said commonly referenced first conductor pairs, each of said second further conductors being adapted to be activated to produce a dot on aid thermally sensitive recording means in response to being referenced to a potential different than the potential at which said first pair of conductors are commonly referenced.

15. A thermally sensitive printer as claimed in claim 1, wherein said printer is a column printer, each said column being defined by a first conductor means and a second conductor means with an exothermic resistance means overlying said first and second conductor means, each said first conductor means being selectively coupled to column selecting means for coupling same to a reference potential to effect a printing operation coincident with the referencing of selected conductors of said second conductor means to a potential different from said reference potential during a printing operation.

16. A thermally sensitive printer as claimed in claim 15, wherein said column selecting means include a plurality of transistor means, one transistor means being provided for each first conductor means of each column and a plurality of second transistor means equal to the number of second conductors defining said second conductor means, each said second transistor means being coupled to a like positioned second conductor in each said column.

17. A thermally sensitive printer as claimed in claim 13, wherein said printing head substrate includes a plurality of grooves formed therein, each of said first and second conductors comprising said first and second conductor means being disposed in said grooves formed in said substrate, said exothermic resistance means overlying said grooves and conductors at predetermined positions to define said printing head.

18. A thermally sensitive printer as claimed in claim 18, wherein said printing head includes a plurality of print columns, each print column including said first conductor means and said second conductor means, and an exothermic resistance means overlying said first and second conductor means, each said exothermic resistance means being formed in alignment with said other exothermic resistance means to thereby print a line of dots in response to the selective energization of said first conductor and at least two of said second conductors in each column during a printing operation.

19. A thermally sensitive printer as claimed in claim 16, and including diode means coupled intermediate each of said second conductors in each said print column and said second transistor means coupled thereto for assuring a unidirectional flow of current through said exothermic resistance means overlying said first and second conductor means.

20. In a thermally sensitive printer for recording a character on a thermally sensitive medium, the improvement comprising in combination; exothermic printing means including a substrate and a plurality of selectively energized resistance means supported by said substrate, said resistance means being adapted to be energized during a printing operation to thereby print characters on a thermally sensitive medium; rotary platen means for bringing said thermally sensitive recording means into printing contact with said resistance printing means to effect printing thereby, said rotary platen means being further adapted to incrementally advance said thermally sensitive medium after each printing operation; driving means adapted to oscillate and produce a reciprocating rotary drive motion; transformer means disposed intermediate said drive means and said rotary platen means for converting the reciprocating rotary driving motion produced by said driving means into a one-way incrementally advancing rotary driving motion, said transformer means including rotary transmitting means for mechanically coupling said transformer means to said rotary platen means to effect a rotation of said rotary platen means through a predetermined pitch in response to said one-way driving motion of said driving means to thereby incrementally advance said thermally sensitive medium by a predetermined distance after each printing operation; a one-piece frame having a U-shaped cross-section defined by a support member and two upstanding leg portions, said respective leg portions rotatably supporting said rotary platen means, said driving means and said transformer means; support means for supporting said exothermic printing means substrate, said support means including a spindle rotatably supported by said upstanding legs of said frame and including resilient biasing means for resiliently tensioning said support means against said rotary platen means, said support means being adapted to resiliently bias said resistance means on said substrate into pressure contact with said thermally sensitive medium to thereby engage said thermally sensitive medium between said resistance element means and said rotary platen means; and manual feeding means operatively coupled to said rotary platen means for effecting an introduction of the thermally sensitive medium to the printer, a feeding of the thermally sensitive medium through the printer and a removal of the thermally sensitive medium from the printer at one of the start and completion of a plurality of printing operations, whereby loading of the printer is facilitated thereby.

* * * * *